United States Patent [19]

Tanabe

[11] Patent Number: 5,119,361

[45] Date of Patent: Jun. 2, 1992

[54] OPTICAL INFORMATION READOUT APPARATUS

[75] Inventor: Yuzuru Tanabe, Yokohama, Japan

[73] Assignee: Asahi Glass Company Ltd., Tokyo, Japan

[21] Appl. No.: 413,074

[22] Filed: Sep. 27, 1989

[30] Foreign Application Priority Data

Sep. 29, 1988 [JP] Japan .................. 63-242354

[51] Int. Cl.$^5$ ............................. G11B 7/00
[52] U.S. Cl. ................. 369/121; 369/122
[58] Field of Search .......... 369/122, 121, 100, 112

[56] References Cited

U.S. PATENT DOCUMENTS

| | | | |
|---|---|---|---|
| 4,449,204 | 5/1984 | Shimada et al. | 369/122 |
| 4,769,805 | 9/1988 | Gottfried | 369/122 |
| 4,783,152 | 11/1988 | Nishimoto . | |
| 4,791,625 | 12/1988 | Nakamura | 369/122 |
| 4,804,835 | 2/1989 | Ando | 369/122 |
| 4,887,255 | 12/1989 | Handa et al. | 369/122 |

Primary Examiner—Roy N. Envall, Jr.
Assistant Examiner—Khoi Truong
Attorney, Agent, or Firm—Oblon, Spivak, McClelland, Maier & Neustadt

[57] ABSTRACT

An optical information readout system including a record medium having a record layer capable of storing information and of reading the same optically, a resonating mirror arranged in substantially parallel to and apart at a predetermined distance from the record medium, a laser medium arranged between the record medium and the resonating mirror, a light source for pumping the laser medium, and a detector for detecting changes in a laser resonance, wherein the information recorded in the record medium is read by utilizing the surface of the recording medium as the other resonating mirror of the laser resonator and by detecting the changes of laser resonance resulted from the changes of the record medium surface by the detector.

17 Claims, 5 Drawing Sheets

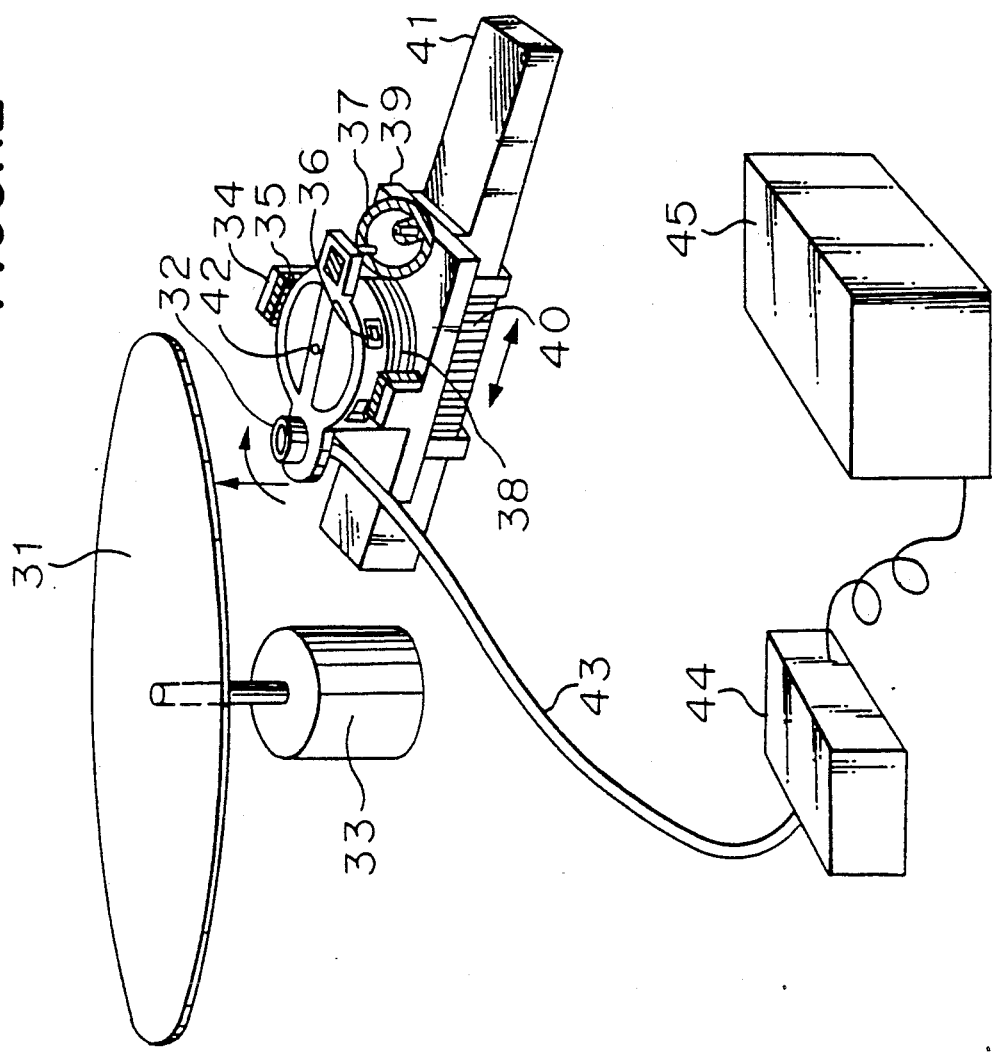

OPTICAL INFORMATION READOUT APPARATUS

BACKGROUND OF THE INVENTION

1. Field of the Invention

The present invention relates to an optical information readout apparatus having an optical pickup for an optical information record medium such as an optical disc, a magneto-optical disc or the like. More particularly, it relates to a laser resonator type optical information readout apparatus capable of reading out information recorded in a record medium by utilizing the surface of the record medium as a part of the laser resonator and by detecting changes in a laser resonance.

2. Discussion of Background

FIG. 5 shows the basic construction of an optical pickup for an optical disc or a magneto-optical disc. Laser beams excited from a semiconductor laser 1 are rendered to be parallel beams by a collimator lens 2. The parallel beams are passed through a polarizing beam splitter 3 with a predetermined plane of polarization. Then, the beams are passed through a $\lambda/4$ plate 4 so that a state of polarization is changed, and are converged by a focusing lens 5 to be irradiated to a record medium 7. The beams are reflected at the surface of the record medium 7 and are again passed through the $\lambda/4$ plate 4 where the plane of polarization is changed. Namely, the plane of polarization is 90° different from that of the original beams. The beams passed through the $\lambda/4$ plate 4 are reflected at the polarizing beam splitter 3 to be detected by a detector 6.

The conventional optical pickup having the construction described above has problems that the weight is heavy and the manufacturing cost is high because it needs a large number of structural elements and is therefore bulky. Further, because of the above-mentioned reason, adjusting operations such as aligning an optical axis and aligning positions for a number of structural elements are complicated. Furthermore, an additional optical device is needed so that light to be irradiated to the record medium 7 is rendered to be linearly polarized light when a change of rotation of the plane of polarization in a magneto-optical disc has to be read.

SUMMARY OF THE INVENTION

It is an object of the present invention to eliminate the problems in the conventional technique and to provide an optical information readout apparatus having an optical pickup of a small size, low manufacturing cost, a relatively small number of structural elements and easily adjustable. The change of rotation of the plane of polarization of beams can be detected by a nonlinear optical device wherein efficiency of converting to the second harmonic wave changes depending on a state of polarization or a laser rod emitting linearly polarized light. Further, it is possible to readout the information from a record medium having a high record density by using the nonlinear optical device.

The foregoing and other objects of the present invention have been, attained by providing a laser resonator type optical information readout apparatus which comprises a record medium having a record layer capable of storing information and of reading the same optically, a resonating mirror arranged substantially parallel to and apart at a predetermined distance from the record medium, a laser medium arranged between the record medium and the resonating mirror, a light source for pumping the laser medium, and a detector for detecting changes in a laser resonance, wherein the information recorded in the record medium is read by utilizing the surface of the record medium as the other resonating mirror of the laser resonator and by detecting the changes in a laser resonance resulted from the changes of the record medium surface by the detector.

As the record medium, a compact disc for audio, a laser disc for recording images, a CD-ROM as an optical memory and so on are used, which may be either a phase shift type or a magneto-optical type.

As the resonating mirror, ordinarily, a mirror on which a multi-layered optical film having a high permeability (at least 95%) to excited light and a high reflectivity (at least 95%) to laser beams is formed, may be used. A resonating mirror formed by applying the multi-layered optical film on the opposite surface of the laser medium with respect to the record medium may be used. Further, it is possible to converge the laser beams by finishing the opposite surface to have a shape of convex lens on which the multi-layered optical film is coated. This provides both functions as a converging lens and a resonating mirror. A concave mirror may be used for the resonating mirror. In this case, it is unnecessary to finish the laser medium.

As the laser medium, a solid state laser rod formed of crystallized YAG, YLF, YAP, GGG, $BeAl_2O_4$ and so on may be used. Further, it is possible to use a gas laser medium or a liquid laser medium by sealing gas or liquid in a container. It is preferable to use the solid state laser rod from the viewpoint of miniaturization of a pickup device.

Although a semiconductor laser, a solid state laser, a gas laser, a liquid laser and so on may be used for a light source for pumping, the semiconductor laser is preferably used from the viewpoint of miniaturization of a pickup device.

For the detector, an optoelectric converter such as a photodiode, a CCD or the like can be used so that it detects laser beams passing through the record medium, or it detects scattered light from the record medium, or it detects laser beams on the optical axis between the resonating mirror and the light source for pumping by deflecting the light path.

Laser beams from the light source for pumping may be directly introduced in the laser medium through the resonating mirror. However, the laser beams may be introduced by using an optical fiber. In this case, the light source for pumping is kept immovable while the other parts are driven. Accordingly, such construction is advantageous in consideration of the speed and easy control of driving.

In a case that the change of rotation of the plane of polarization of a disc such as a magneto-optical disc is detected, a laser medium such as crystallized YLF may be used as a laser rod so as to obtain linearly polarized light. Further, it is possible to increase a density of record and sensitivity of detection by arranging a nonlinear optical device such as crystallized $KNbO_3$, $\beta$-$BaB_2O_4$, $KTiOPO_4$, $KH_2PO_4$ on the optical axis between the record medium and the laser rod. Further, the optical pickup of the present invention can be applied to a magneto-optical disc by utilizing the nature that efficiency of conversion to the second harmonic wave changes depending on a state of polarization.

The foregoing objects are also achieved by an optical information readout apparatus which comprises a first driving unit such as a motor to rotate the record medium in a disc form, a second driving unit such as a combination of a motor, a gear wheel, a rack and a pinion which moves and scans the pickup in the radial direction of the record medium and a signal processing unit for processing digital signals from the pickup into signals for audio, pictures and so on. In this case, the apparatus becomes compact as a whole and errors in reading out information becomes small.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIGS. 1 to 4 and 6 show an embodiment, of the laser resonator type optical information readout apparatus of the present invention wherein FIGS. 1, 3 and 4 are diagrams of the basic construction of the apparatus of the present invention and FIG. 2 is a graph showing data in driving tests for the apparatus of FIG. 1;

FIG. 6 is a perspective view showing the basic construction of the optical information readout apparatus according to a fourth embodiment of the present invention.

DETAILED DESCRIPTION OF PREFERRED EMBODIMENT

In the present invention, the laser resonator assumes either a resonating state or a non-resonating state depending on the reflectivity of an optical disc or a magneto-optical surface, a state of polarization or a change in various other surfaces. Namely, a slight change in a surface can be greatly amplified so as to read the change as digital information corresponding to the digits of 0 and 1.

Figure 1:
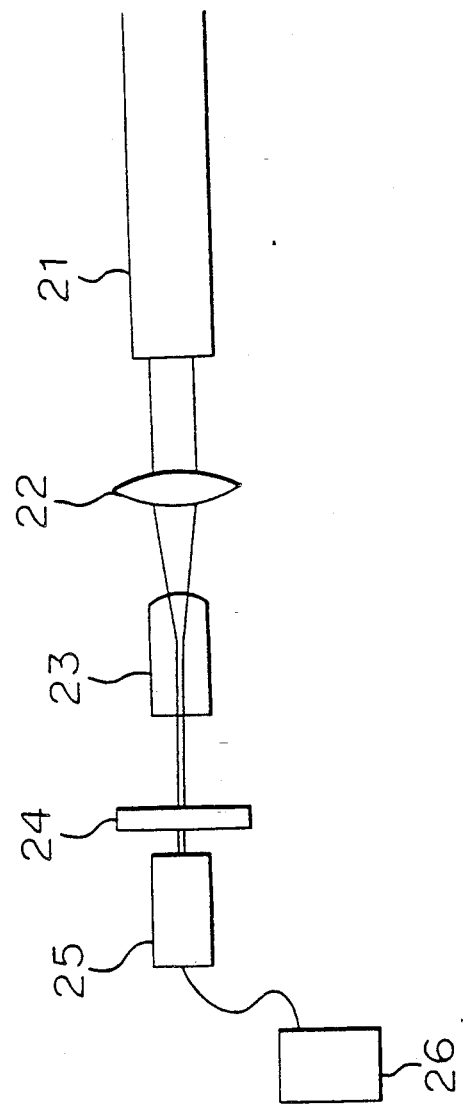

FIG. 1 shows an embodiment of the laser resonator type optical information readout apparatus according to the present invention. A CW-dye laser 21 having a wavelength of 808.5 nm is used as a light source for pumping. Laser beams emitted from the CW-dye laser 21 are focused by a focusing lens 22 to be introduced in a laser rod 23 consisting of a YAG laser (having a wavelength of 1,064 nm) as a laser medium. The end surface at the side of the light source for pumping of the laser rod 23 is finished to have a shape of convex lens having a radius of curvature of 10 mm so that the YAG laser beams can be converged. A multi-layered optical film having a high transmittance to the laser beams from the light source for pumping and a high reflectivity to the YAG laser beams is formed on the end surface in a convex lens form so that it functions as a resonating mirror. The length of the resonator formed by cooperating with the surface of the record medium 24 is 11.5 mm. The record medium 24 is so formed that a disc-like transparent glass plate is covered by a multi-layered optical film so that there are regions having a reflectivity of 92.6% and regions having a reflectivity of 91.2% in a dot-form wherein binary information corresponding to 1 and 0, i.e. digital information is recorded. A power meter 25 having therein a photodiode is used for a detector and the signal of the power meter is supplied to a measuring device 26.

Figure 2:
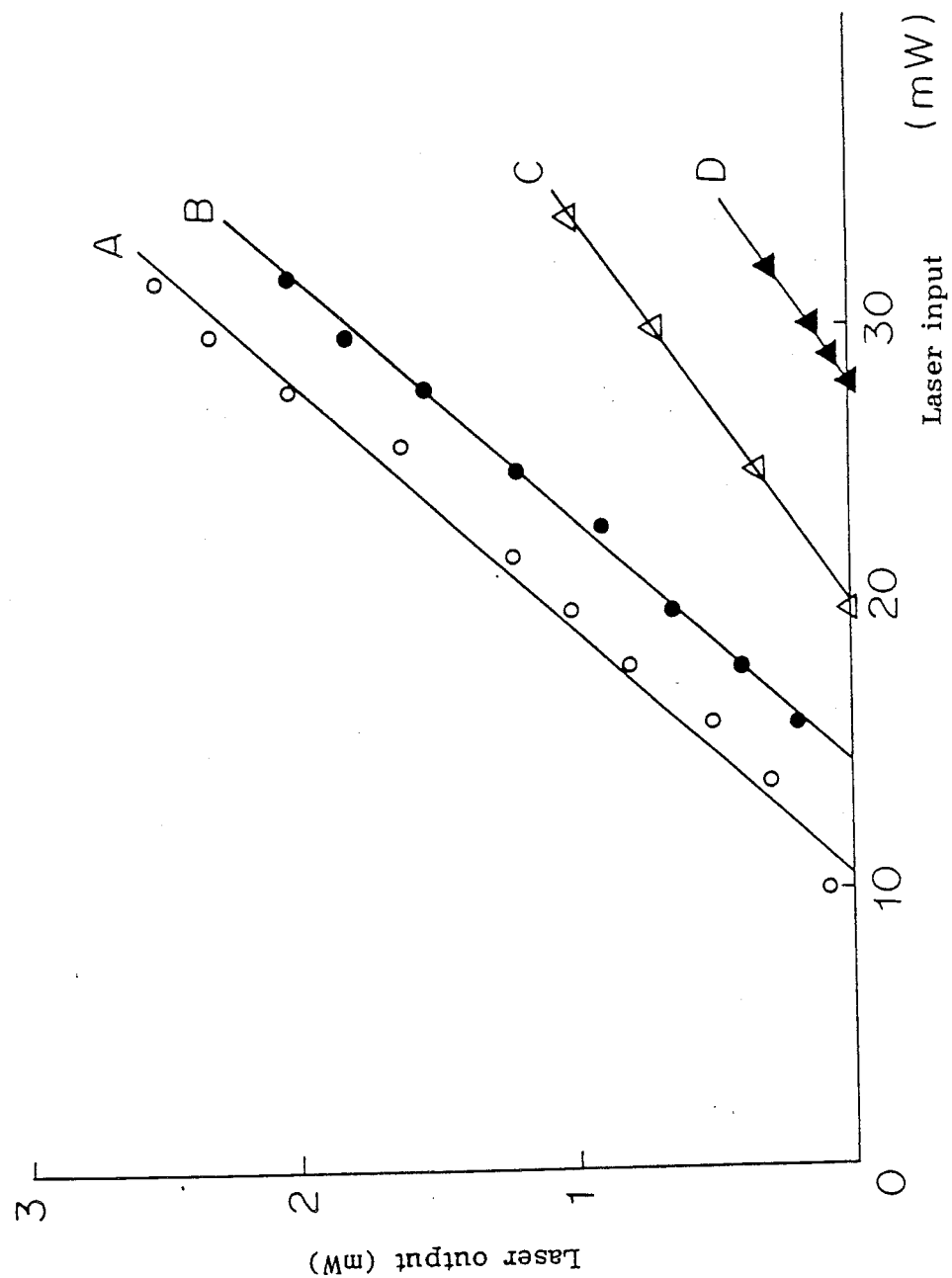

FIG. 2 shows a result of tests of actuation of the apparatus according to the present invention wherein the abscissa represents input values of the laser beams from the light source for pumping and the ordinate represents output values of the YAG laser which are measured by the power meter 25. Linear lines A, B, C and D are respectively approximations of data (symbols ○) at the regions of a reflectivity of 92.6%, data (the symbols of ●) at the regions of a reflectivity of 91.2% (when the diameter of laser beams on the surface of the record medium 24 is 125 μm), data (the symbols of △) at the regions of a reflectivity of 92.6% and data (the symbols of ▲) at the regions of a reflectivity of 91.2% (when the diameter of laser beams on the surface of the record medium is 25 μm). As is clear from FIG. 2, it is found that the changes of laser output, changes in a laser resonance derived from the changes of the reflectivity of the record medium surface can be detected as binary information. In this embodiment, a semiconductor laser may be used for the light source for pumping in order to make the entire size of the pickup compact. Further, the end surface of the laser rod 23 may be made flat but not in a form of convex lens, and a multi-layered optical film is formed on the flat end surface. In this case, however, an additional focusing lens is necessary between the record medium 24 and the laser rod 23. Further, the end surface of the laser rod 23 may be made flat and a concave mirror is used as a resonating mirror. In this case, it is unnecessary to use the focusing lens between the record medium 24 and the laser rod 23.

Figure 3:
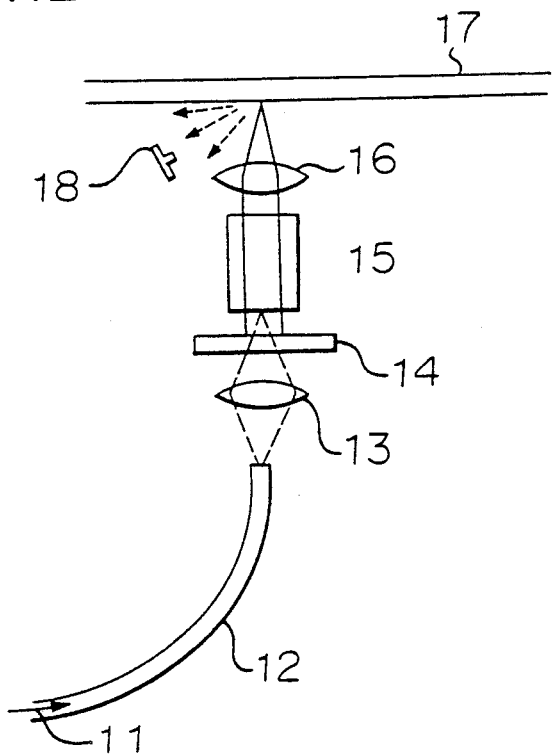
Figure 5:
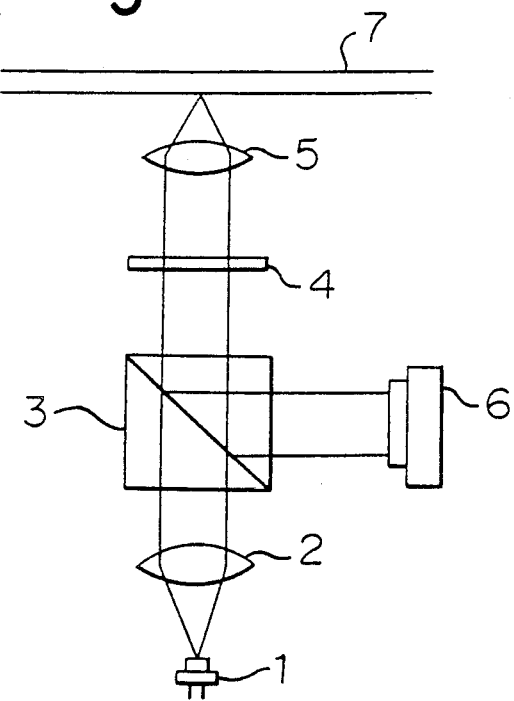
FIG. 5 is a diagram showing the basic construction of a conventional pickup.

FIG. 3 shows a second embodiment of the present invention. A laser resonator optical readout apparatus is constituted by a record medium 17 such as an optical disc, a magneto-optical disc or the like and a resonating mirror 14 placed substantially parallel to the record medium 17 and a laser rod 15 of a solid state laser such as crystallized YAG is arranged in the laser resonator. A light source for pumping of the solid state laser is a semiconductor laser. Laser beams 11 emitted from the semiconductor laser are introduced by means of an optical fiber 12, focused by a focusing lens 13, and received by the laser rod 15 through the resonating mirror 14. The resonating mirror 14 is subjected to a coating treatment so that the laser beams 11 emitted from the semiconductor laser are passed therethrough, but the laser beams emitted from the solid state laser are reflected. The laser beams from the solid state laser are focused by the focusing lens 16 to be irradiated to the record medium 17. A detector 18 is disposed near the surface of the record medium 17 and near the laser resonator in order to measure the scattered light. As the detector 18, an optoelectric converter such as a photodiode, a CCD or the like can be used.

Driving tests were conducted under the conditions that a semiconductor laser having a wavelength of 810 nm as a light source for pumping, a YAG laser rod having a wavelength of 1,064 nm as the laser rod 15 and a photodiode as the detector 18 were used. The changes of two kinds of reflectivity in the surface of the record medium 17 caused the changes of laser resonance, and the changes of the intensity of the scattered light due to the changes of laser resonance could be detected as binary information.

In this embodiment, the semiconductor laser for the light source for pumping may be arranged in the vicinity of the resonating mirror 14 without using the optical fiber 12 so that the laser beams 11 from the semiconductor laser can be directly introduced in the focusing lens.

Further, the detector 18 may be so formed that the laser beams in the laser resonator are partly deflected by means of a beam splitter.

Figure 4:
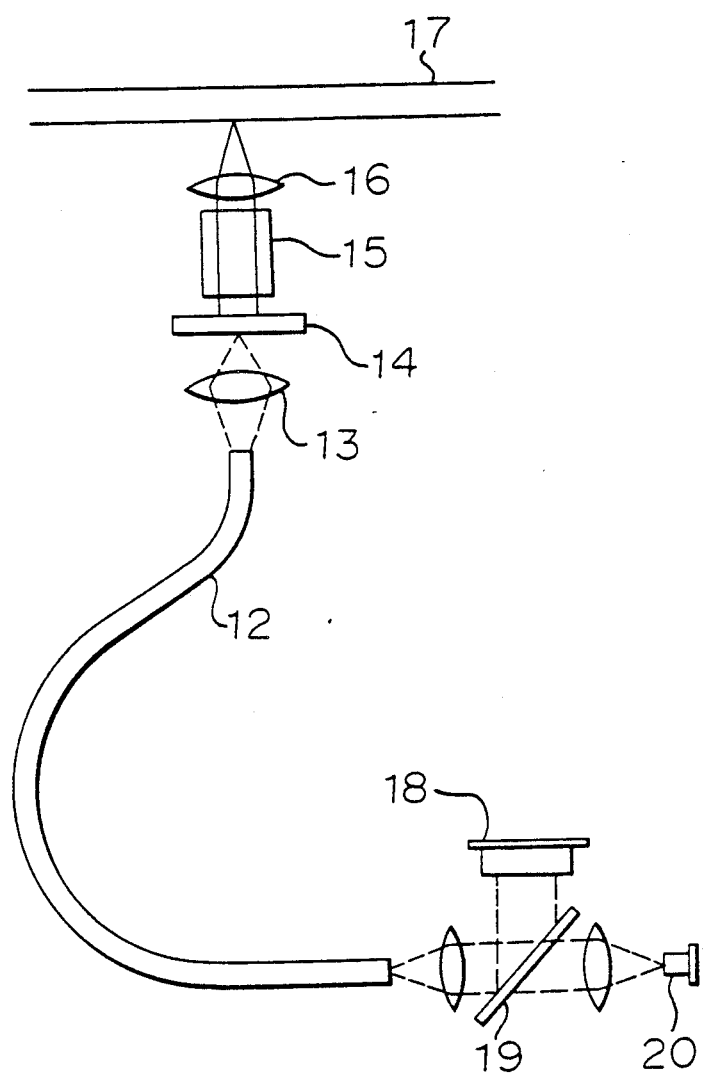

FIG. 4 shows a third embodiment of the present invention. The same reference numerals as in FIG. 3 designate the same or corresponding parts. A light path reflecting device for reflecting the light path for the laser beams from a semiconductor laser 20 is arranged on the light axis between the resonating mirror 14 and the semiconductor laser 20, and the detector 18 is disposed to detect light reflected by the light path reflecting device. A wavelength selecting and transmitting reflective film is coated on the resonating mirror 14. The laser beams from the solid state laser are partly transmitted out of the laser resonator and are separated by deflection from the light path by means of a separating mirror 19 so that the separated beams are detected by the detector 18. For the light path deflecting device, a beam splitter utilizing a prism may be used instead of the separating mirror 19. Further, the laser beams from the semiconductor laser 20 may be directly introduced in the focusing lens without using the optical fiber 12.

Driving tests were conducted by using a semiconductor laser having a wavelength of 810 nm, a YAG laser rod having a wavelength of 1,064 nm and the above-mentioned detector 18 of a photodiode. The changes of two kinds of reflectivity in the surface of the record medium 17 caused the changes of laser resonance and the changes of the laser output of the YAG laser due to the changes of laser resonance could be detected as binary information.

In the above-mentioned second and third embodiments, the focusing lens 16 can be omitted for further miniaturization by using a convex mirror as the resonating mirror 14 to thereby converge the laser beams.

FIG. 6 shows the fourth embodiment of the present invention. FIG. 6 is a perspective view showing the basic construction of the optical information readout apparatus according to the present invention. An optical disc 31 in a form of circular plate is rotated at a predetermined angular speed by a first driving unit 33. A digital information of the rotating optical disc 31 is read out by an optical pickup 32 having an axis-slide-rotation type driving unit. A bobbin 42 is rotatably inserted in a shaft provided at a fixing table 39 for the optical pickup 32 and the bobbin is normally held and fixed at a predetermined position by means of a rubber spring 37. The bobbin is further provided with a focusing coil 38 for focusing the optical pickup 32 by its axis-slide movement and a tracking coil 36 for tracking the optical pickup 32 by its axis-rotation movement. The focusing coil 38 and the tracking coil 36 form a magnetic circuit in association with an electromagnet 35 attached to an outer yoke 34 so as to effect the axis-sliding movement and the axis-rotating movement of the bobbin to a position where a magnetic force produced by an electric current flowing into the electromagnet 35 and the elasticity of the rubber spring are balanced. As the second driving unit which moves the optical pickup 32 in the radial direction of the optical disc 31, a linear d.c. motor 40 placed below the fixing table 39 is used. The fixing table 39 is caused to slide for scanning in its radial direction by the linear d.c. motor 40 on a base 41 which fixes the fixing table 39 at a predetermined position. The optical information is introduced from the optical pickup 32 to optical fibers 43, detected by a photosensor 44 and transmitted to a signal processing section 45. In this embodiment, the optical pickup is such one as shown in FIG. 4. In the signal processing section 45, various kinds of processing such as photoelectric conversion and voice signal conversion or picture image conversion, i.e. conversion from binary signals to audio-frequency signals, color signals or brightness signals are performed. The signal processing section includes a optoelectronic converter, a microcomputer or other processing circuits to effect the above-mentioned processing.

In the above-mentioned embodiment, the semiconductor laser as the light source for pumping is contained in the photosensor 44 so that the laser beams are introduced by the optical fibers 43. However, the laser beams may be directly received in the optical pickup 32 without using the optical fibers 43.

The optical information readout of the present invention has an optical pickup which can be constituted by a relatively small number of structural elements and therefore can be miniaturized in addition that adjusting operations such as aligning optical axes and the positions of the structural elements can be simplified. Further, the slight changes of reflectivities in the record medium surface can be detected with good sensitivity as binary information. Further, in accordance with the present invention, the laser beams from the light source for pumping can be introduced by the optical fiber. Accordingly, the light source for pumping can be fixed and the other driving system can be used, whereby it is advantageous for the speed of driving and control and the driving part can be small-sized.

Obviously, numerous modifications and variations of the present invention are possible in light of the above teachings. It is therefore to be understood that within the scope of the appended claims, the invention may be practiced otherwise than as specifically described herein.

What is claimed is:

1. An optical information readout apparatus which comprises:
   a record medium having a record layer capable of storing information and of reading the same optically,
   a resonating mirror arranged substantially parallel to and apart at the predetermined distance from said record medium,
   a laser medium arranged between said record medium and said resonating mirror having a surface with a shape of a convex lens for converging laser beams emitted from said laser medium,
   a light source for pumping said laser medium, and
   a detector for detecting changes in a laser resonance, wherein the information recorded in said record medium is read by utilizing a surface of said record medium as another resonating mirror of the readout apparatus and by detecting changes in a laser resonance resulting from changes of the record medium surface by said detector.

2. The apparatus according to claim 1, wherein said resonating mirror is formed on the opposite surface of said laser medium with respect to said record medium.

3. The apparatus according to claim 2, wherein a multi-layered optical film is formed on the opposite surface of said laser medium with respect to said record medium.

4. The apparatus according to claim 1, wherein said resonating mirror is arranged with a space at the opposite side of said laser medium with respect to said record medium.

5. The laser apparatus according to claim 1, wherein said light source for pumping is a semiconductor laser.

6. The apparatus according to claim 1, which further comprises an optical fiber to transmit laser beams from said light source for pumping.

7. The apparatus according to claim 1, wherein a detector for detecting optically the information stored in said record medium is arranged at the opposite side of said laser medium with respect to said record medium so that laser beams passing through said record medium are detected.

8. The apparatus according to claim 1, wherein a detector for detecting optically the information stored in said record medium is arranged around said readout apparatus near the record medium surface so that light scattered from said record medium is detected.

9. The apparatus according to claim 1, wherein a light path deflecting device is arranged on the optical axis between said resonating mirror and said light source for pumping to thereby change the light path of laser beams, and said detector for detecting optically the information stored in said record mirror is arranged to detect the laser beams deflected by said light path deflecting device.

10. The readout apparatus according to claim 1, wherein a nonlinear optical device is arranged on the optical axis between said record medium and said laser medium in the readout apparatus.

11. An optical information readout apparatus which comprises:
 a disc type record medium having a record layer capable of storing information and of reading the same optically;
 a laser resonator optical pickup, comprising:
 a resonating mirror arranged substantially parallel to and apart at a predetermined distance from said record medium,
 a laser medium arranged between said record medium and said resonating mirror having a convex lens shaped face,
 a light source for pumping said laser medium, and
 a detector for detecting changes in a laser resonance, wherein the information recorded in said record medium is read by utilizing the surface of said recording medium as the other resonating mirror of the laser resonator and by detecting the changes in a laser resonance resulted from the changes of the record medium surface by said detector;
 a first driving unit for rotating said disc type record medium;
 a second driving unit for moving and scanning said laser resonator type optical pickup in the radial direction of said record medium; and
 a signal processing unit for processing digital signals from said laser resonator type optical pickup to thereby read the information.

12. The optical information readout apparatus according to claim 11, wherein said light source for pumping is a semiconductor laser.

13. The optical information readout apparatus according to claim 11, which further comprises an optical fiber to transmit laser beams from said light source for pumping.

14. The optical information readout apparatus according to claim 11, wherein a detector for detecting optically the information stored in said record medium is arranged at the opposite side of said laser medium with respect to said record medium so that laser beams passing through said record medium are detected.

15. The optical information readout apparatus according to claim 11, wherein a detector for detecting optically the information stored in said record medium is arranged around said laser resonator near the record medium surface so that light scattered from said record medium is detected.

16. The optical information readout apparatus according to claim 11, wherein a light path deflecting device is arranged on the optical axis between said resonating mirror and said light source for pumping to thereby change the light path of laser beams, and said detector for detecting optically the information stored in said record medium is arranged to detect the laser beams deflected by said light path deflecting device.

17. The optical information readout apparatus according to claim 11, wherein a nonlinear optical device is arranged on the optical axis between said record medium and said laser medium in the laser resonator.

* * * * *